(No Model.)

G. N. BRINTNELL.
FEEDER AND BAND CUTTER.

No. 467,698. Patented Jan. 26, 1892.

Witnesses:

Inventor
George N. Brintnell
by James J. Sheehy
Attorney.

UNITED STATES PATENT OFFICE.

GEORGE NELSON BRINTNELL, OF CANIFTON, ASSIGNOR OF ONE-HALF TO JAMES BIRRELL, OF NAPANEE, CANADA.

FEEDER AND BAND-CUTTER.

SPECIFICATION forming part of Letters Patent No. 467,698, dated January 26, 1892.

Application filed November 18, 1891. Serial No. 412,284. (No model.) Patented in Canada May 9, 1891, No. 36,569.

*To all whom it may concern:*

Be it known that I, GEORGE NELSON BRINTNELL, a citizen of Canada, residing at Canifton, in the county of Hastings and Province of Ontario, Canada, have invented certain new and useful Improvements in Feeders and Band-Cutters, (for which I obtained a patent in Canada May 9, 1891, No. 36,569;) and I do declare the following to be a full, clear, and exact description of the invention, such as will enable others skilled in the art to which it appertains to make and use the same.

This invention has relation to an improvement in band-cutters and feeders for thrashing-machines; and among other things it has for its object to facilitate and expedite the operation of feeding bundles of grain to the cylinder of a thrashing-machine by providing a durable and effective means for carrying the bundles beneath a pressure-roll and cutters, which means will not draw any of the loose grain beneath the feed board or frame; by providing a spreader to operate simultaneously and in conjunction with the feeding devices; by providing agitators at a point in front of the spreader, so as to more effectively serve in loosening or spreading the grain as it enters the cylinder or concave, and by adapting the cutters and pressure-rolls to be raised from the feeder-frame when operating upon loose grain.

Other objects and advantages will appear from the following description and claims, when taken in connection with the annexed drawings, in which—

Figure 1:
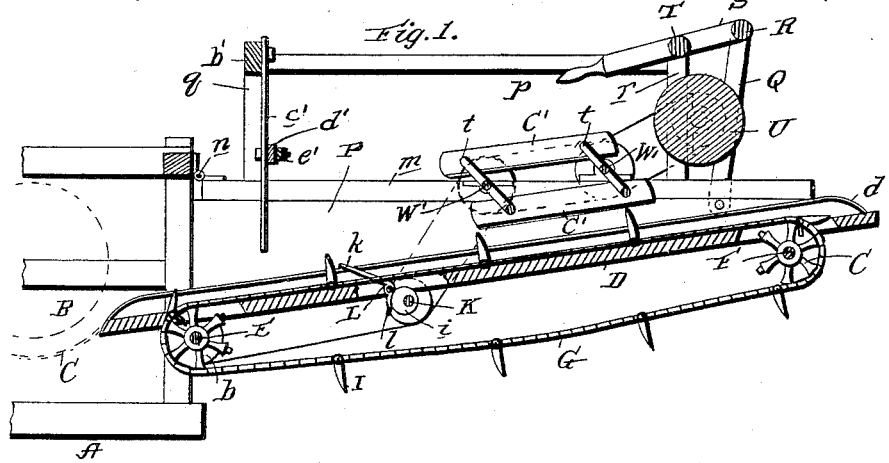
Figure 2:
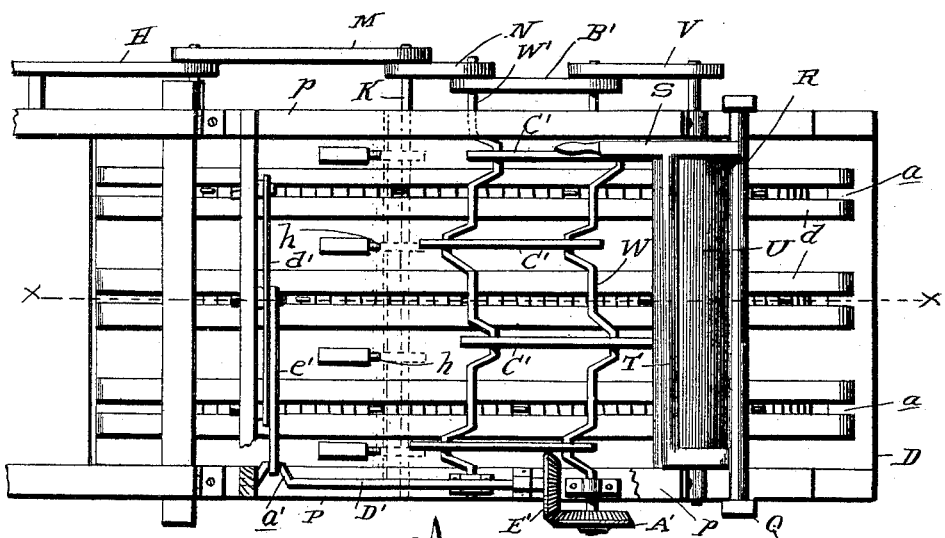
Figures 3, 4:
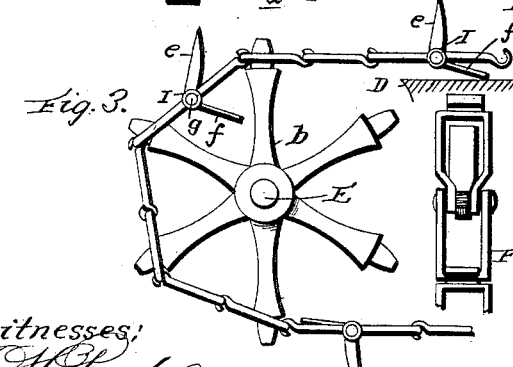
Figure 5:
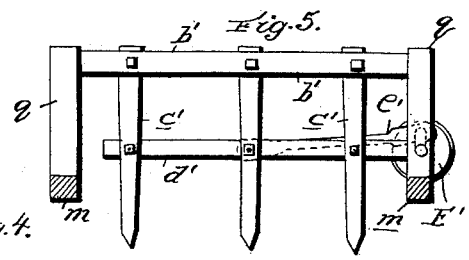

Figure 1 is a longitudinal central sectional view of my improved machine, showing the same attached to the receiving end of a thrashing-machine. Fig. 2 is a plan view of the same with the thrashing-machine broken away. Fig. 3 is a side view of one of the sprocket-wheels, showing a sprocket-chain with my improved feeding-fingers attached. Fig. 4 is a plan view of a section of the chain with one of the feeders in position, and Fig. 5 is a cross-sectional view of the hinged frame carrying the spreaders with the latter illustrated in elevation.

Referring by letter to said drawings, A indicates the receiving end of the thrashing-machine.

B indicates in dotted lines the thrashing-cylinder, and C the usual concave therein.

D indicates the feeder-frame, which is disposed on the usual pitch or incline, as shown, and is provided with a suitable number of slots $a$ for the passage of feed-chains, there being three slots and chains shown in the present illustration.

E indicates a transverse shaft, which is arranged at a suitable point, as shown, and carries fixed sprocket-wheels $b$, a similar shaft F being arranged transversely at the opposite under side of the frame D and carrying similar sprocket-wheels C.

The upper side of the frame or board D has the slots or grooves $a$, provided at opposite sides with longitudinal flanges $d$, which are designed to protect the chains, as will presently appear.

The shaft F, as well as the shaft E, are arranged beneath slots in the frame D, so that the endless chains G, connecting the sprocket-wheels, may be allowed to pass on opposite sides of the inclined board or frame D, and the shaft E is projected at one end from the main frame, as shown, and carries a fixed pulley thereon to receive a drive-belt H, so as to receive motion, as will be presently described, and impart the same through the medium of the sprocket-wheels to the endless chains G. These endless chains or feed-chains G carry fingers I, which are of a form substantially as shown, having a branch $e$ and a toe $f$ arranged relatively at right angles thereto, and are pivoted at their angles by a rivet or bolt $g$, which connects the ends of the chain-links at that point; or these fingers may be so adapted as to engage the cross-bar of the chain-links, the object being to sustain the fingers in a perpendicular position while traveling along the upper side of the board or frame D and allow them to swing freely on their pivots as they approach the lower end of the board or frame, so that while they will serve effectively in carrying the grain down the inclined frame they will be prevented from drawing any of the loose grain beneath said frame. The board or frame D is also provided at a suitable point in its length with a number of vertical elongated slots $h$, and beneath the frame adjacent to these slots is arranged a transverse shaft K, provided at points corresponding with the slots h with eccentrics i.

L indicates agitators. These agitators, which are of an angular form, are pivoted in the slots h and have their upper branch or fingers k extending above the frame or board D, and also have a branch l depending below said frame and designed to be engaged by the eccentrics i on the shaft K. This shaft K is provided with a pulley or pulleys, designed to receive and impart motion by means of belts M and N. It will thus be seen that as the shaft K is rotated, as will be presently described, the eccentrics contacting with the depending branches of the agitators will keep the upper fingers of the same continually reciprocating.

P indicates the cutter and roller-frame. This frame is composed of two lateral longitudinal beams m, which are hinged, as shown at n, to the thrasher-frame, so that their opposite ends may be allowed a vertical movement, and two beams or bars p, arranged at a suitable altitude above the bars m and secured in position at one end by posts or standards q and at their opposite ends by posts or standards r.

Q indicates vertical arms, which are pivotally secured at their lower ends to the frame D. These arms are of a greater height than the standards r, and have journaled in their upper ends a transverse shaft R, which has fixed to it near one end a hand-lever S, and said hand-lever is in turn suitably connected with a transverse shaft T, mounted on the standard r in such a manner that by raising the grip end of said hand-lever the frame P and its attachments may be consequently raised with respect to the frame D.

U indicates a pressure-roll. This roll is arranged transversely, as shown, and has its bearings in the standard r. The shaft of this roller is projected at one end and carries a pulley to receive a drive-belt V.

W indicates a transverse shaft, which has its bearings in the beams m of the frame P. This shaft, which is provided at suitable points with alternating cranks t, carries at one end a pulley over which the endless belt V passes, and the opposite end carries a beveled gear-wheel A'. W' indicates a similar transversely-arranged crank-shaft, which is disposed parallel to the shaft W, and also has its bearings in the beams m of the frame T, with a pulley or pulleys on one end to receive a connecting endless belt B'.

C' indicates cutters, which are composed of blades and journaled near opposite ends in the respective cranks of the shafts W and W', so that when said shafts have been rotated the cutters will be given a vertical reciprocating motion.

D' indicates a lateral longitudinal shaft, which also has its bearings in the frame P and carries at one end a beveled gear-wheel E', designed to mesh with the wheel A' on the shaft W, and its opposite end is provided with a crank a' for a purpose which will be presently explained.

b' indicates a cross-bar, which is connected at its opposite ends with the standards q. Depending from this cross-bar b' are fingers c', which are pivotally secured at their upper ends to said cross-bars b', and are pivotally connected at a suitable point in their length by a transverse bar d', and this bar is in turn connected by means of a pitman e' with the crank a' on the rotary shaft D'. By this construction it will be seen that when the shaft D' has been rotated the pitman e' will impart a lateral reciprocation to the fingers c', so as to spread the grain just before entering the thrasher.

The operation of my invention is as follows: When the bundles of grain are deposited upon the frame D, motion is imparted to the feeding, cutting, pressing, spreading, and agitating devices in the following manner: The belt H, connecting the pulley on the shaft of the thrashing-cylinder with the pulley on the shaft E, turns the sprocket-wheel thereon, and these wheels in turn impart a motion to the shaft F and its sprocket-wheels by means of the endless chains G, thereby driving said chains so as to carry the pivoted angular fingers thereon successively down the upper side of the frame D, and consequently the grain placed thereon. Motion is simultaneously imparted from the pulley on the shaft E, through the medium of the belt M, to the transverse shaft K, carrying the eccentric, which latter, contacting with the agitators L, operates the same. From this shaft K motion is imparted, through the medium of belt N, to the crank-shaft W', and from thence, through the medium of the belt B', to the crank-shaft W. Motion being imparted to the cutters C, connecting the crank-shafts, is also imparted from one end of the shaft W by means of a belt V to the roller U, and at its opposite end by means of the gear-wheel A', through the medium of the gear-wheel E', to the crank-shaft D'. Motion is communicated from this crank-shaft D', through the medium of the pitman e' and the connecting-bar D', to the reciprocating spreader-fingers c', so that motion of all of the parts is simultaneous and uniform, and it will be observed that in feeding loose grain when it is desirable to throw the thrasher-roll and cutters out of operation, as well as the spreader, it is simply necessary to raise the frame P.

Having described my invention, what I claim is—

1. A band-cutter and feeder for thrashing-machines having the following devices in combination: an inclined frame, endless belts arranged to travel on said frame and having pivoted angular feeders, vertically-movable reciprocating cutters, a vertically-movable pressure-roll, reciprocating agitator-fingers arranged between the endless chains on the inclined frame, and a vertically-movable and laterally-reciprocating spreader, the cutter, pressure-roll, and the reciprocating spreader being mounted on the hinged frame and all adapted to operate simultaneously, substantially as specified.

2. In a band-cutter and feeder, the combination, with the inclined frame adapted to receive grain, of a hinged frame arranged above the same and carrying the pivoted reciprocatory spreaders, the vertically-reciprocating cutters, and the pressure-rolls, substantially as specified.

3. The combination, with the inclined frame and a thrashing-machine, of the endless belts connected by sprocket-wheel, the feeders pivotally secured to the belts, the annular agitators pivoted in the inclined frame, the rotatable shaft having eccentrics to engage and impart motion to the agitators, the pivoted or hinged frame, the crank-shaft journaled therein and connected by cutters, the spreader, the crank-shaft carrying a gear-wheel at one end and engaging a gear-wheel on one of the crank-shafts of the cutters, and a pitman connecting said crank-shaft with the spreaders, and a pressure-roll, also connected with one of the crank-shafts of the cutters, substantially as specified.

In testimony whereof I affix my signature in presence of two witnesses.

GEORGE NELSON BRINTNELL.

Witnesses:
C. C. GREENLEAF,
H. W. GREENLEAF.